United States Patent Office 3,301,796
Patented Jan. 31, 1967

3,301,796
METHOD OF EPOXIDE OR EPISULFIDE COPOLYMER POLYMERIZATION WITH NITRO AROMATIC COMPOUND
Robert Johnston Herold, Akron, Ohio, assignor to The General Tire & Rubber Company, Akron, Ohio, a corporation of Ohio
No Drawing. Filed Jan. 20, 1964, Ser. No. 338,577
8 Claims. (Cl. 260—2)

This invention relates to the use of aromatic nitroorganic compounds in polymerization systems employing an organometallic catalyst. This invention applies to polymerization systems for certain epoxides and episulfides containing aliphatic unsaturation which is activated for free radical polymerization.

It has been found that copolymerization of various aliphatically unsaturated epoxide or episulfide compounds with alkylene oxides or sulfides in contact with certain organometallic catalysts, alone or with activators, produces insoluble gels which are unsuitable for use in the preparation of elastomeric stocks. This gelling phenomenon may be caused by the activity of the organometallic catalysts, such as zinc diethyl, alone or with activators, such as water or oxygen, in polymerizing free radical polymerizable compounds such as vinyl compounds, allyl compounds and other aliphatically unsaturated compounds. This gelling phenomenon is minimized when light or other radiation is excluded from the catalyzed system. Polymerization can be accomplished in the dark, but milling the resulting polymer must be accomplished in the presence of light. If the catalyst is not effectively deactivated following polymerization, the polymer may gel during milling. It is therefore desirable to incorporate in the polymerization system a gelation inhibitor.

Previously known inhibitors such as hydroquinone or methoxy phenol are known to react with metal alkyls so as to effectively nullify the free radical scavenging action of the hydroquinone and methoxy phenol.

One of the objects of this invention is to provide an additive which inhibits free radical catalysis without interfering with ionic catalysis in a polymerization system. Another and more specific object is to provide a method of inhibiting gel formation in certain organometallic-catalyzed polymerization systems by the inclusion of a simple additive. Another object is to provide such a gelation inhibitor which does not interfere with the organometallic catalyst. Another object is to provide an essentially gel-free polymer from an epoxide or episulfide polymerization system comprising an activated unsaturated compound and catalyzed by an organometallic compound.

This invention resides in the discovery that nitroaromatic hydrocarbon compounds inhibit gelation apparently caused by free radical reactions such as that which takes place through aliphatic unsaturation without interfering with ionic reactions such as the polymerization reactions of certain cyclic ether compounds, such as the alkylene oxides or epoxides, and certain cyclic thioether compounds, such as the episulfides.

This invention includes a modified polymerization method and the modified system as represented in the polymerizable composition of matter consisting essentially of a mixture of organic compounds containing and polymerizable through cyclic ether or cyclic thioether groups of from 2 to 3 carbon atoms and containing some activated aliphatic unsaturation, well-known catalysts for epoxide polymerization, well-known cocatalysts for the catalysts and the novel ingredient, a nitroaromatic compound.

More particularly, this invention includes a composition of matter consisting essentially of (A) a mixture of compounds, each compound containing and polymerizable through only one cyclic ether or cyclic thioether group of from 2 to 3 carbon atoms, at least 0.5 mol percent of the compounds in said mixture containing aliphatic unsaturation which is made sensitive to free radical polymerization by the presence of a halogen atom or a non-carbonyl oxygen or sulfur atom on a carbon atom alpha to an unsaturated carbon, (B) an organometallic compound of the formula $MR_y$ in which M is a metal selected from the group consisting of aluminum, beryllium, cadmium, gallium and zinc, each R is basically a monovalent hydrocarbon radical, at least one R is attached preferably to M through a non-aromatic carbon atom and $y$ is a positive integer equal to the valence of M, from about 0.1 to about 2 mols per mol of (B) of (C) a cocatalyst for (B) selected from the group consisting of oxygen and active-hydrogen-containing compounds, (B) and (C) being present in a total amount of from 0.0001 to 0.1 mol per mol of (A), and from about 0.01 to about 5 mols per mol of (B) of (D) a nitroaromatic compound. Preferably, the molar ratio of D to B is 0.01:1.0 to 1.0:1.0.

All the components used in the methods and appearing in the compositions of this invention are well known. Component A can include any aliphatically saturated organic compound containing a di- or tri-carbon cyclic ether group and polymerizable through this group. The compounds suitable for inclusion in component A include only one structure in which one oxygen or sulfur atom is joined with 2 or 3 carbon atoms in a ring which opens in the process of polymerization. These compounds can include 1, 2 or more, preferably no more than 1, aliphatic carbon-to-carbon double bonds with certain limitations as noted below. Although these compounds are generally hydrocarbon ethers or thioethers, derivatives of these compounds can likewise be employed, such as halogen, nitro and ester substituted derivatives. Thus there can be used epoxides, oxetanes, similar unsaturated cyclic oxides, similar unsaturated cyclic sulfides, their aliphatic, cycloaliphatic or aromatic substituted derivatives, such as the alkyl, cycloalkyl and aryl substituted derivatives, and their ester, halogen, ether, thioether, and nitro substituted derivatives.

More specifically, component A can include, for example, ethylene oxide, ethylene sulfide, propylene episulfide, propylene oxide, 2,3-epoxy butane, 1,2- epoxy butane, 1,2-epoxy dodecane, isobutylene oxide, butadiene monoxide, butadiene monosulfide, 2-methylpentene-1-oxide, 2-methylbutene-1-oxide, 3-allyloxy-3-methyl oxetane, 3-vinyl-3-methyl oxetane, styrene oxide, methyl glycidyl ether, ethyl glycidyl ether, allyl glycidyl ether, allyl glycidyl sulfide, alpha-methyl styrene oxide, vinyl cyclohexene monoxide, thio glycidyl allyl ether, cyclooctadiene monoxide, cyclooctene monoxide, 1,2-diisobutylene oxide, 2,3-diisobutylene oxide, phenyl glycidyl ether, p-chlorophenyl glycidyl ether, oxetane ($C_3H_6O$), 3-3-diethyl oxetane, 2-methylene-1,3-epoxy propane (3-methylene oxetane), 3-allyloxy-oxetane, 3-ethyl-3-butyl oxetane, 3,3-dimethyl oxetane, 3,3-di(chloromethyl) oxetane, 3-methyl-3-chloromethyl oxetane, 3-methyl-3-ethyl oxetane, dicyclopentadiene monoxide, 1,2-hexacontene oxide, 1,2-heptacontene oxide, butene monoxide, dodecene monoxide, isoprene monoxide and other similar materials having 1 epoxide, oxetane or episulfide group and up to 70 carbon atoms and the like. Mixtures of these compounds can be used if desired.

Component A must contain at least 0.5 mol percent of cyclic ether or cyclic thioether compounds containing aliphatic unsaturation activated for free radical polymerization, for example, by halogen or non-carbonyl oxygen or sulfur atoms on carbon atoms alpha to the double bond, to gain the benefit of this invention since it is this particular type of unsaturation which creates the gel or cross-linking problem during polymerization and which is inactivated by the nitroaromatic compounds of this invention.

The term "aliphatic unsaturation" is intended to include cycloaliphatic unsaturation. The term "activated" is intended to designate those aliphatic double bonds in which a carbon atom alpha to the double bond has attached thereto a halogen atom or an oxygen atom which is non-carbonyl, i.e., the oxygen bonds go to different carbon atoms, or a non-carbonyl sulfur atom. Epoxides or episulfides containing aliphatic unsaturation which is activated by a carbonyl oxygen or a carbonyl sulfur attached to a carbon alpha to the double bond, e.g.,

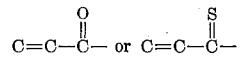

or by the carbon alpha to the double bond being part of a polyunsaturated ring are not operable in this invention because they cause gelation even in the presence of nitroaromatic compounds. Epoxides containing unactivated aliphatic unsaturation, e.g., vinyl cyclohexene monoxide and 1,2-epoxyhexene-5, and similar episulfides can be present as they do not cause gelation.

It is preferable to use the lower molecular weight saturated compounds such as ethylene oxide, propylene oxide, butylene oxide and propylene episulfide with minor amounts of unsaturated compounds such as allyl glycidyl ether, allyl thioglycidyl ether and butadiene monoxide. Preferred compound mixtures for component A are those containing a total of from about 0.5 to about 15 mol percent of one or more unsaturated compounds with the balance being saturated compounds.

The use of from about 0.5 to 15 mol percent of an unsaturated compound in component A provides curable and rubbery copolymer stocks which can be used either alone or in a mixture with other rubbers (natural, butadiene-styrene, polybutadiene, polyisoprene, nitrile and similar unsaturated copolymers) to produce tire treads, tire carcasses, hose, shoe soles or belt stocks. In order to obtain the optimum stability of the stock as measured by accelerated oxygen aging tests at elevated temperatures coupled with desirable curing characteristics, it is more preferred to use from about 0.5 to 10.0 mol percent of one or more of the unsaturated compounds with the balance being one or more of the unsaturated compounds.

Component B employed in this invention can be any of a number of organometallic catalysts for epoxide polymerization. A typical class of such catalysts has the general formula $MR_y$ in which M can be an aluminum, beryllium, cadium, gallium or zinc atom, at least one R is a monovalent hydrocarbon radical and y is a positive integer equal to the valence of M.

At least one of the groups represented by R can be a hydrocarbon containing an aromatic group, a hydrocarbon containing an aromatic group and substituted with one cyano radical (—CN), a hydrocarbon containing an aromatic group and substituted with from one to five halogen radicals (fluorine, chlorine, bromine and/or iodine), or a hydrocarbon containing an aromatic group and substituted with from one to five of these halogen atoms and a cyano radical. Moreover, the remaining R groups can be at least one —Cl, —CN, —F, —Br or —I radical. The R groups, where they are substituted or unsubstituted hydrocarbons, may be the same or different. The hydrocarbons containing the aromatic group may be selected from the class consisting of aryl, alkaryl, aralkyl, alkenylaryl, aralkenyl, cycloalkaryl, arcycloalkyl, cycloalkenylaryl or arcycloalkenylene substituted and unsubstited hydrocarbon radicals having from 6 to 20 carbon atoms.

Preferably, each R is an aliphatic, cycloaliphatic or aromatic monovalent hydrocarbon radical with at least one R per M attached to M through an aliphatic carbon atom, i.e., a carbon atom not in an aromatic ring. The term "aliphatic carbon atom" is intended to include cycloaliphatic carbon atoms. They preferably contain no more than about 30 carbon atoms, more preferably no more than about 18 carbon atoms and even more preferably no more than about 10 carbon atoms. They are all preferably non-aromatic and most preferably alkyl radicals.

Examples of organometallic compounds falling within the scope of the above-identified formula and useful as component B of this invention are triethyl aluminum, triisobutyl aluminum, trioctyl aluminum, methyl ditolyl aluminum, diphenyl methyl aluminum, tricyclobutyl aluminum, diphenyl aluminum fluoride, diphenyl aluminum chloride, phenyl aluminum dichloride, di(o-chloro phenylene) aluminum chloride, di(o-tolyl) aluminum cyanide, tri(3-chloro phenyl cyclohexylene) aluminum, di(phenyl cyclohexylene) aluminum bromide, di(benzyl phenylene) aluminum iodide, benzyl phenylene aluminum dicyanide, tri(3-cyano-5-methyl-phenyl-1) aluminum tri(4-fluoromethyl phenylene) aluminum, tri(beta-naphthyl) aluminum, di(o-cyano phenyl butylene) aluminum bromide, di(p-chlorophenyl butylene) aluminum cyanide, benzyl phenyl aluminum chloride, chlorophenyl benzyl aluminum cyanide, bromophenyl chlorophenyl aluminum cyanide, diethyl beryllium, di-n-butyl beryllium, amyl phenyl beryllium, dicyclohexyl beryllium, ethyl tolyl beryllium, dibenzyl beryllium, diphenyl beryllium, phenyl beryllium cyanide, di-o-tolyl beryllium, phenyl beryllium chloride, o-tolyl beryllium fluoride, di(biphenylyl) beryllium, p-chlorophenyl beryllium cyanide, o-bromophenyl p-cyanophenyl beryllium, di(fluorophenyl) beryllium, diethyl cadmium, diisoamyl cadmium, dihexyl cadmium, dioctadecyl cadmium, methylalphanaphthyl cadmium, ethylbenzyl cadmium, ethyl propyl cadmium, methylcyclohexylphenylene cadmium, tolyl methyl cadmium, trimethyl gallium, tripropyl gallium, dimethyl phenyl gallium, tricyclohexyl gallium, trihexyl gallium, dimethyl zinc, diethyl zinc, dibutyl zinc, ethyl o-tolyl zinc, diisopropyl zinc, ethyl p-tolyl zinc, dibenzyl zinc, methyl ethyl zinc, dicyclohexyl zinc, methylnaphthyl zinc, methyl phenyl zinc, didecyl zinc, dioctadecyl zinc, diphenyl zinc, phenyl zinc cyanide, di-o-tolyl zinc, phenyl zinc chloride, o-tolyl zinc fluoride, phenyl cyclohexylene zinc bromide, di(phenylcyclohexylene) zinc, dicumenyl zinc, tolyl phenyl zinc, di-p-chlorophenyl zinc and the like and mixtures thereof.

The zinc compounds are preferred. Mixtures of these organic aluminum, beryllium, cadmium, gallium and zinc compounds can be used. Some of these compounds may spontaneously ignite; they should be kept under an inert atmosphere or in an inert solvent until used and should be added to the monomer carefully.

Component C can be any of the well-known cocatalysts or activators for the organometallic catalysts of component B. These include, for example, oxygen, alumina or alumina in chemical combination with oxides of metals selected from the groups II, III and IV of the periodic table, or an active-hydrogen-containing compound, preferably containing no more than two active hydrogens, such as water or a monohydric alcohol such as methanol and ethanol.

The active-hydrogen-containing compounds used in component C can also be compounds having the general formulae $H_2A$ or ZAH in which each A can be sulfur, selenium or tellurium and Z can be any alkyl or aryl radical attached to A through a carbon atom. Examples of such compounds include hydrogen sulfide, hydrogen selenide, hydrogen telluride, methyl mercaptan or methane thiol, ethyl mercaptan, n-propyl mercaptan, isopropyl mercaptan, tertbutyl mercaptan, dodecyl mercaptan, octadecyl mercaptan, phenyl mercaptan, benzyl mercaptan, cyclohexyl mercaptan, beta-naphthyl mercaptan, propyl-selenomercaptan (propaneselenol-1), seleno-phenol, cyclobutylselenomercaptan, methylselenomercaptan, hexylselenomercaptan, tolyl selenomercaptan, benzyl selenomercaptan, ethyl telluromercaptan ($C_2H_5TeH$), butyl telluromercaptan, amyltelluromercaptan, cycloheptyl telluromercaptan, phenyltelluromercaptan, dodecyl telluromercaptan, tolyl telluromercaptan and alpha-naphthyl telluromercaptan and the like. Mixtures of these sulfur, selenium and tellurium compounds can be used. It is preferable to use hydrogen sulfide and the alkyl, alkaryl, aralkyl or aryl mercaptans. These compounds can readily be made by methods known to those skilled in the art.

Component C can also be an active-hydrogen-containing compound such as a primary aromatic amine, an amide, a cycloalkadiene of from 5 to 6 carbon atoms or a secondary amine composed of at least one nitrogen atom, from about 2 to about 14 carbon atoms per nitrogen atom and at least 6 total hydrogen atoms per nitrogen atom, any remaining atoms in the secondary amines being ethereal oxygen atoms, hydroxyl oxygen atoms or thio-ethereal sulfur atoms and any nitrogen atom having two aromatic rings attached thereto being part of a cyclic amino compound.

Typical primary aromatic amines include, for example, o-aminoacetanilide, o-, m- and p-aminoacetophenone, aniline, 4-nitroaniline, m-fluoroaniline, anthrylamine, o-aminobenzamide, 1,2,3-benzene-triamine, m-biphenyl amine, 3-amino-o-cresol, 2-naphthylamine, o-phenetidine, m-aminothiophenol, o-toluidine, and 4-chloro-o-phenylenediamine.

Typical amides include, for example, in addition to the amides shown above, acetamide, thioacetamide, o-acetoluide, acrylamide, adipamide, benzamide, cinnamamide, diacetamide, phthalimide, 2-pyrrolidone, urea and N-ethyl-N'-phenylurea. The preferred amides are those in which the only carbon atoms attached to nitrogen are carbonyl carbon atoms.

Typical secondary amines within the above-defined limits include, for example, N-butylaniline, N-methylaniline, N-ethylbutylamine, N-ethylcyclohexylamine, diethanolamine, diethylamine, difurfurylamine, B-ethoxy-morpholine, 5,10-dihydrophenazine, phenothiazine, 1-methylpiperazine, 2-pipecoline, pyrrolidine and N-methylthiophenine. The defined secondary amines are preferred among the nitrogen compound. The preferred secondary amines are phenothiazine and cycloaliphatic amines containing at least 4 carbon atoms per nitrogen atom, any remaining atoms being hydrogen and, permissibly, ethereal oxygen atoms, such as, for example, pyrrolidine, piperidine and morpholine, which can be generically defined as cycloaliphatic secondary amines composed of one —NH— unit and from 4 to 5 —$CH_2$— units, any remaining atoms being ethereal oxygen atoms.

Where component C is oxygen, it can be employed in amounts ranging from 0.1 to 1.5 mol of oxygen per mol of (B). Where component C consists essentially of the alumina-based compounds, it can be employed in amounts ranging from 0.01 to 1000 percent by weight of (C) based on the weight of (A).

When component C comprises active-hydrogen-containing materials, it can be employed in amounts ranging from about 0.1 mol of (C) per mol of (B) to amounts equivalent to about two active hydrogens per molecule of (B), i.e., about 2 mols of (C) per mol of (B) where (C) contains one active hydrogen per molecule or about 1 mol of (C) per mol of (B) where (C) contains two active hydrogens per molecule. However, it is preferred that there be at least about 0.5 mol of (C) per mol of (B) and most preferred at least about 0.8 mol of (C) per mol of (B).

Component D is the novel feature or ingredient of this invention and can be any nitroaromatic hydrocarbon compound such as, for example, nitrobenzene, o-nitrotoluene, chlorodinitrobenzene, nitrophenylphenylamine, 2,4'-dinitrobiphenyl, dinitrodiphenylamine, 4,4'-dinitrobiphenyl, m-nitrotoluene, p-nitrotoluene, 2,4-dinitrotoluene, p-dinitro-benzene and 1,3,5-trinitrobenzene. Note that the aromatic rings can be substituted with halogen atoms, amine groups and aliphatic side chains.

The amount of component D is practically limited to the range of about 0.01 to about 5 mols of (D) per mole of (B). Less than about 0.01 mol of (D) per mol of (B) has little effect whereas more than 5 mols of (D) per mol of (B) does not further improve the activity or stability of the system and contributes an extraneous ingredient in the ultimate product.

Components B and C act together to catalyze the polymerization of component A. The total amount of catalyst employed (components B and C together) usually varies with the temperature. At higher temperatures, e.g., 80° C. or 100° C., less catalyst is required than at lower temperatures. It is generally preferred to operate in the temperature range of about 40° C. to about 100° C. since high temperatures tend to cause undesirable side reactions while very low temperatures require long periods of time to get satisfactory yields although molecular weights of polymers produced at low temperatures are generally higher than molecular weights of polymers produced at high temperatures.

There is generally used from about 0.01 to 10 mols of (B) and (C) per 100 mols of (A) or, stated conversely, from about 10 to about 10,000 mols of (A) per mol of (B) and (C) together. More than about 10 mols of (B) and (C) per 100 mols of (A) is wasteful and can be deleterious. It is preferable to employ about 0.2 to about 5 total mols of (B) and (C) per 100 mols of (A).

Polymerization can be accomplished in mass (sometimes referred to as "in bulk") or in solvent. It is to be understood that when polymerizing in mass some of the monomeric component A can act as a solvent for the polymer as it is being formed, and the formed polymer while in a liquid state can also act as a solvent. Examples of solvents which can be used include toluene, benzene, hexane, heptane, octane, xylene, cyclohexane, diethyl ether, methylene, chloride, chloroform, dioxane and trichloroethylene. Inert or relatively inert non-polar solvents are preferred. When solvents are employed, there should be a sufficient amount in which both component A and the polymeric product can be dispersed.

Polymerization can be conducted under pressure and should be conducted under a non-oxidizing atmosphere. The non-oxidizing atmosphere can be solvent vapor including the vapor of monomer component A, but is preferably an inert gas such as nitrogen, helium, argon or neon or mixtures thereof. Pressures can vary from one atmosphere up to 150 atmospheres although they generally are in the range of 1 to 25 atmospheres. Polymerization times vary depending primarily on the temperature, the content of components A, B, C and D and their molar relationship and the presence of solvent.

Preferably, components B and C are mixed in a diluent which may be A or the solvent or both. It is most advantageous to add C to B although the reverse procedure may also be utilized. Component D should be added after B and C are mixed or with C, but in no case should it be added to B before the addition of C.

Many of the polymers obtained by the method of the present invention have a high average molecular weight, i.e., from about 50,000 to 500,000 or higher, as shown by their intrinsic viscosities of at least about 1. They may be crystalline and/or amorphous. These polymers are useful as coating for fabrics, films for packaging materials, elastic fibers, adhesives, and in making tires, shoe heels, raincoats, and upholstery materials, floor mats, molded articles and the like. Liquid polymers of this invention are useful as plasticizers for natural and synthetic resins and rubbers.

The polymers may be compounded with the usual rubber and resin compounding materials, such as curing agents, anti-degradants, fillers, extenders, ultraviolet light absorbers, fire resistant materials, dyes, pigments, plasticizers, lubricants, other rubbers and resins and the like.

The following examples are illustrative of the claimed invention.

EXAMPLE I

In each run of this example 1,2-epoxypropane (also known as propylene oxide), allyl glycidyl ether and water in molar proportions of 90:10:0.8 were mixed for several minutes at room temperature under a nitrogen atmosphere with nitrobenzene in the amounts shown based on the total mols of the epoxides. Zinc diethyl in an amount equal to 1.0 mol percent based on the total mols of the epoxides was then added, with stirring, and allowed to react for a few minutes at room temperature after which heptane was added in an amount equal to 5 parts by weight of heptane per part of epoxide. Portions of each solution were heated at 80° C. for the times shown, and polymerization was stopped by the addition of a solution of phenyl-beta-naphthylamine in wet acetone to kill the catalyst. The resulting samples were then checked for percent conversion, intrinsic viscosity (measured in isopropanol at 60° C.) and weight percent gel content.

Table I

| Run | Mol Percent Nitrobenzene | Pzn Time (Hours) | Conversion, Percent | Intrinsic Viscosity | Percent Gel |
|---|---|---|---|---|---|
| A | 0 | 1.0 | 8 | 7.01 | 41 |
| B | 0 | 23.5 | 100 | 6.20 | 45 |
| C | 0.1 | 1.0 | 28 | 6.89 | 0 |
| D | 0.1 | 22 | 100 | 5.28 | 0 |
| E | 0.5 | 1.0 | 28 | 6.47 | 0 |
| F | 0.5 | 19 | 100 | 5.19 | 0 |
| G | 1.0 | 1.0 | 22 | 5.50 | 0 |
| H | 1.0 | 22 | 100 | 3.88 | 0 |
| I | 2.5 | 1.0 | 31 | 4.24 | 0 |
| J | 2.5 | 22 | 100 | 2.60 | 0 |
| K | 5.0 | 0.75 | 22 | 3.90 | 0 |
| L | 5.0 | 22 | 100 | 2.30 | 0 |

EXAMPLE II

The experiment described in Example I was repeated substituting the following nitroaromatic compounds for the nitrobenzene in amounts equal to 0.1 mol percent based on the total mols of epoxide.

Table II

| Run | Nitroaromatic Compound | Pzn Time (Hours) | Conversion, Percent | Intrinsic Viscosity | Percent Gel |
|---|---|---|---|---|---|
| M | p-Dinitrobenzene | 3 | 25 | 2.27 | 0 |
| N | do | 45 | 97 | 2.10 | 0 |
| O | 1,3,5-trinitrobenzene | 21 | 45 | 1.30 | 0 |
| P | do | 49 | 70 | 1.34 | 0 |
| Q | o-Nitrotoluene | 1.0 | 18 | 5.65 | 0 |
| R | do | 21 | 94 | 5.15 | 0 |
| S | m-Nitrotoluene | 1.0 | 17 | 5.00 | 0 |
| T | do | 21 | 100 | 5.85 | 0 |
| U | 2,4-dinitrotoluene | 1.0 | 29 | 4.16 | 0 |
| V | do | 23 | 100 | 2.35 | 0 |
| W | 2,4-dinitrobiphenyl | 1.0 | 20 | 3.27 | 0 |
| X | do | 24 | 100 | 4.62 | 0 |
| Y | 4,4'-dinitrobiphenyl | 1.0 | 33 | 4.30 | 0 |
| Z | do | 24 | 100 | 2.92 | 0 |

EXAMPLE III

Two mixtures were prepared by conventional techniques, each containing 75 grams of propylene oxide, 14 grams of allyl glycidyl ether, 0.17 gram of water, 1.23 grams of zinc diethyl and 0.15 gram of one nitroaromatic compound from the group nitrophenylphenylamine and chlorodinitrobenzene. After prolonged storage the resulting polymers were dissolved in acetone and no gel was detected. A control mixture which did not contain a nitroaromatic compound produced a polymer which had a substantial gel content after similar storage.

EXAMPLE IV

When the following ingredients are mixed with 0.08 mol of water, 0.1 mol of nitrobenzene and about 5 parts by weight of heptane per part by weight of epoxide, all mixing being done in accordance with the procedure described in Example I, and the resulting mixtures are heated at 80° C. for 64 hours, the resulting products are rubbery polymers which are gel-free.

Table III

| Mixture | Ingredient | Moles | Ingredient | Mole | Ingredient | Mole |
|---|---|---|---|---|---|---|
| AA | 1,2-epoxypropane | 9.7 | Butadiene monoxide | 0.3 | ZnEt$_2$ | 0.1 |
| BB | do | 9.7 | Methallylglycidyl ether | 0.3 | ZnEt$_2$ | 0.1 |
| CC | do | 9.7 | Vinylcyclohexene monoxide | 0.3 | ZnEt$_2$ | 0.1 |
| DD | 1,2-epoxybutane | 9.7 | Allyl glycidyl ether | 0.3 | ZnEt$_2$ | 0.1 |
| EE | 1,2-epoxypropane | 9.7 | do | 0.3 | BeEt$_2$ | 0.1 |
| FF | do | 9.7 | do | 0.3 | AlEt$_3$ | 0.2 |
| GG | do | 9.7 | do | 0.3 | CdEt$_2$ | 0.2 |
| HH | do | 9.7 | do | 0.3 | Al (i-Bu)$_3$ | 0.2 |
| II | do | 9.7 | do | 0.3 | GaMe$_3$ | 0.2 |
| JJ | do | 9.7 | do | 0.3 | Zn (C$_6$H$_{13}$)$_2$ | 0.2 |
| KK | do | 9.7 | Thioglycidyl allyl ether | 0.3 | ZnEt$_2$ | 0.1 |
| LL | do | 9.7 | Glycidyl allyl thioether | 0.3 | ZnEt$_2$ | 0.1 |

EXAMPLE V

A compolymer was prepared by the interreaction of propylene oxide and allyl glycidyl ether in a mol ratio of 9:1 in solution in heptane in an amount equal to 5 mols of heptane per mol of total monomer in contact with the reaction product of zinc diethyl and water added in amounts equal to 0.50 mol percent and 0.35 mol percent based on the total monomer and in contact with 0.03 weight percent nitrobenzene based on the total monomer weight (equivalent to 0.031 mol of nitrobenzene per mol of zinc diethyl).

The heptane, the zinc diethyl and half the propylene oxide were charged to a reactor at room temperature. To this a dispersion of the water, the nitrobenzene and the rest of the propylene oxide was added with stirring over a two minute period. The allyl glycidyl ether was added separately immediately thereafter. The resulting system was heated to 90° C. After 3 hours 37.5% of the monomer had been converted to a polymer having an intrinsic viscosity in isopropanol at 60° C. of 4.20. After 20 hours all of the monomer had been converted to a polymer having an intrinsic viscosity in isopropanol at 60° C. of 4.45. The polymer solution after 20 hours showed at most a faint haziness whereas a control run without nitrobenzene produced a distinctly cloudy solution. Thus, the nitrobenzene even at low levels of concentration inhibits gel formation.

What I claim is:

1. In a method which comprises contacting (A) a mixture of organic compounds each compound containing and polymerizable through a single cyclic ether or thioether group of from 2 to 3 carbon atoms, at least 0.5 mol percent of the compounds in said mixture containing aliphatic unsaturation and having an atom selected from the group consisting of halogen and non-carbonyl oxygen atoms attached to a carbon atom alpha to the double bond, none of the compounds in component (A) containing aliphatic unsaturation wherein the alpha carbon is a part of a polyunsaturated ring, none of the compounds in component (A) containing aliphatic unsaturation wherein the alpha carbon has attached thereto a carbonyl oxygen atom, (B) an organometallic epoxide polymerization catalyst and (C) a cocatalyst for (B), the improvement which comprises introducing into the polymerization system from about 0.01 to about 5 mols per mol of (B) of (D) a nitroaromatic compound, whereby gelation of (A) is inhibited during and after polymerization.

2. In a method which comprises contacting (A) a mixture of organic compounds each compound containing and polymerizable through a single group selected from the group consisting of cyclic ether groups of from 2 to 3 carbon atoms and cyclic thioether groups of from 2 to 3 carbon atoms, at least 0.5 mol percent of the compounds in said mixture containing aliphatic unsaturation and having an atom selected from the group consisting of halogen and non-carbonyl oxygen and sulfur atoms attached to a carbon atom alpha to the double bond, none of the compounds in component (A) containing aliphatic unsaturation wherein the alpha carbon is a part of a polyunsaturated ring, none of the compounds in component (A) containing aliphatic unsaturation wherein the alpha carbon has attached thereto a carbonyl oxygen or sulfur atom, (B) an organometallic compound of the formula $MR_y$ in which M is a metal selected from the group consisting of aluminum, berryllium, cadmium, gallium and zinc, at least one R is a group selected from the group consisting of a monovalent hydrocarbon group, a hydrocarbon group containing an aromatic ring and substituted with one cyano group, a hydrocarbon group containing an aromatic ring and substituted with from one to five halogen atoms, and a hydrocarbon group containing an aromatic ring and substituted with a cyano radical and from one to five halogen atoms, any remaining R groups being selected from the group consisting of the cyano group and halogen atoms, and y is a positive integer equal to the valence of M, (C) a cocatalyst for (B) selected from the group consisting of (1) from 0.01 to 1000 percent by weight based on (A) of a compound selected from alumina and alumina in chemical combination with oxides of metals selected from the groups II, III and IV of the periodic table in conjunction with from 0.0001 to 0.1 mol of (B) per mol of (A), (2) from 0.1 to 1.5 mol of oxygen per mol of (B) such that (B) and (C) are present in a total amount of from 0.0001 to 0.1 mol per mol of (A), and (3) active-hydrogen-containing compounds in an amount from 0.1 mol per mol of (B) to an amount equivalent to about two active hydrogen atoms per molecule of (B) such that (B) and (C) are present in a total amount of from 0.0001 to 0.1 mol per mol of (A), the improvement which comprises introducing into the polymerization system from about 0.01 to about 5 mols per mol of (B) of (D) a nitroaromatic compound, whereby gelation of (A) is inhibited during and after polymerization.

3. In a method which comprises contacting (A) a mixture of organic compounds each compound containing and polymerizable through a single group selected from the group consisting of cyclic ether groups of from 2 to 3 carbon atoms and cyclic thioether groups of from 2 to 3 carbon atoms, at least 0.5 mol percent of the compounds in said mixture containing aliphatic unsaturation and having one atom selected from the group consisting of halogen and non-carbonyl oxygen and sulfur atoms attached to a carbon atom alpha to the double bond, none of the compounds in component (A) containing aliphatic unsaturation wherein the alpha carbon is a part of a polyunsaturated ring, none of the compounds in component (A) containing aliphatic unsaturation wherein the alpha carbon has attached thereto a carbonyl oxygen or sulfur atom, (B) an organometallic compound of the formula $ZnR_2$ in which each R is a monovalent hydrocarbon radical, at least one R being attached to each Zn through an aliphatic carbon atom, (C) active-hydrogen-containing compounds selected from the group consisting of water, monohydric alcohols, hydrogen sulfide, monothiols, primary aromatic amines, amides, cycloalkadienes of from 5 to 6 carbon atoms and secondary amines each of which is composed of at least one nitrogen atom, from about 2 to about 14 carbon atoms per nitrogen atom and at least 6 total hydrogen atoms per nitrogen atom, any remaining atoms in the secondary amines being ethereal oxygen atoms, hydroxyl oxygen atoms or thioethereal sulfur atoms and any nitrogen atom having two aromatic rings attached thereto being part of a cyclic amino compound, said active-hydrogen-containing compounds being present in an amount from 0.1 mol per mol of (B) to an amount equivalent to about two active hydrogen atoms per molecule of (B), (B) and (C) being present in a total amount of from 0.0001 to 0.1 mol per mol of (A), the improvement which comprises introducing into the polymerization system from about 0.01 to about 5 mols per mol of (B) of (D) a nitroaromatic compound, whereby gelation of (A) is inhibited during and after polymerization.

4. In a method which comprises contacting (A) a mixture of organic compounds each compound containing and polymerizable through a single group selected from the group consisting of cyclic ether groups of from 2 to 3 carbon atoms and cyclic thioether groups of from 2 to 3 carbon atoms, from 0.5 to about 15 mol percent of the compounds in said mixture containing aliphatic unsaturation and having an atom selected from the group consisting of halogen and non-carbonyl oxygen and sulfur atoms attached to a carbon atom alpha to the double bond, none of the compounds in component (A) containing aliphatic unsaturation wherein the alpha carbon is a part of a polyunsaturated ring, none of the compounds in component (A) containing aliphatic unsaturation wherein the alpha carbon has attached thereto a carbonyl oxygen or sulfur atom, (B) an organometallic compound of the formula $ZnR_2$ in which each R is an aliphatic monovalent hydrocarbon radical of from 1 to 18 carbon atoms and (C) from about 0.5 to about 1 mol of water per mol of (B), (B) and (C) being present in a total amount of from about 0.002 to about 0.05 mol per mol of (A), the improvement which comprises introducing into the polymerization system from about 0.01 to about 5 mols per mol of (B) of (D) a nitroaromatic hydrocarbon compound comprising from 6 to 12 carbon atoms and from 1 to 3 nitro groups.

5. In a method which comprises contacting (A) a mixture of organic compounds each compound containing and polymerizable through a single group selected from the group consisting of cyclic ether groups of from 2 to 3 carbon atoms and cyclic thioether groups of from 2 to 3 carbon atoms, from 0.5 to about 15 mol percent of the compounds in said mixture containing aliphatic unsaturation and having an atom selected from the group consisting of halogen and non-carbonyl oxygen and sulfur atoms attached to a carbon atom alpha to the double bond, none of the compounds in component (A) containing aliphatic unsaturation wherein the alpha carbon is a part of a polyunsaturated ring, none of the compounds in component (A) containing aliphatic unsaturation wherein the alpha carbon has attached thereto a carbonyl oxygen or sulfur atom, (B) an organometallic compound of the formula $AlR_3$ in which each R is an aliphatic monovalent hydrocarbon radical of from 1 to 18 carbon atoms and (C) from about 0.5 to about 1 mol of water per mol of (B), (B) and (C) being present in a total amount of from about 0.002 to about 0.05 mol per mol of (A), the improvement which comprises introducing into the polymerization system from about 0.01 to about 5 mols per mol of (B) of (D) a nitroaromatic hydrocarbon compound comprising from 6 to 12 carbon atoms and from 1 to 3 nitro groups.

6. In a method which comprises contacting (A) a mixture of organic compounds, each compound containing and polymerizable through a single cyclic ether group composed of two carbon atoms and one atom selected from the group consisting of oxygen and sulfur, the remainder of the atoms in each of said compounds consisting essentially of from 1 to 10 carbon atoms, no more than one ethereal oxygen atom, no more than one thioethereal sulfur atom and hydrogen atoms, from 0.5 to 15 mol percent of the compounds in said mixture containing aliphatic unsaturation and having an atom selected from the group consisting of halogen and non-carbonyl oxygen and sulfur atoms attached to a carbon atom alpha to the double bond, none of the compounds in component (A) containing aliphatic unsaturation wherein the alpha carbon is a part of a polyunsaturated ring, none of the compounds in component (A) containing aliphatic unsaturation wherein the alpha carbon has attached thereto a carbonyl oxygen or sulfur atom, (B) a compound of the formula $ZnR_2$ in which each R is an alkyl radical of from 1 to 10 carbon atoms and (C) from 0.5 to 1 mol of water per mol of (B), (B) and (C) being present in a total amount of from 0.002 to about 0.05 mol per mol of (A), the improvement which comprises introducing into the polymerization system from 0.01 to about 5 mols of a monocyclic nitroaromatic hydrocarbon compound.

7. In a method which comprises contacting (A) a mixture consisting essentially of from 99.5 to 85 mol percent 1,2 epoxypropane and from 0.5 to 15 mol percent of a compound selected from the group consisting of allyl glycidyl ether, butadiene monoxide and methallyl glycidyl ether, (B) zinc diethyl and (C) from 0.5 to 1 mol of water per mol of (B), (B) and (C) being present in a total amount of from 0.002 to about 0.05 mol per mol of (A), the improvement which comprises introducing into the polymerization system from 0.01 to about 5 mols of nitrobenzene per mol of zinc diethyl.

8. The mixture product of (A) a mixture consisting essentially of from 99.5 to 85 mol percent 1,2 epoxypropane and from 0.5 to 15 mol percent of a compound selected from the group consisting of allyl glycidyl ether, butadiene monoxide and methallyl glycidyl ether, (B) zinc diethyl, (C) from 0.5 to 1 mol of water per mol of (B), (B) and (C) being present in a total amount of from 0.002 to about 0.05 mol per mol of (A), and from 0.01 to about 5 mols of nitrobenzene per mol of zinc diethyl.

References Cited by the Examiner

UNITED STATES PATENTS

| | | | |
|---|---|---|---|
| 2,662,867 | 12/1953 | Hoertz | 260—29.6 |
| 3,024,219 | 3/1962 | France et al. | 260—88.3 |
| 3,135,705 | 6/1964 | Vandenberg | 260—2 |

OTHER REFERENCES

Lee and Neville: Epoxy Resins, McGraw Hill, New York, 1957, TP986E614, p. 90 et seq. and 44.

MURRAY TILLMAN, *Primary Examiner.*

J. ZIEGLER, *Assistant Examiner.*